US005092446A

United States Patent [19]

Sullivan, Jr. et al.

[11] Patent Number: 5,092,446

[45] Date of Patent: Mar. 3, 1992

[54] HANDRAIL MONITORING SYSTEM

[75] Inventors: Kenneth J. Sullivan, Jr., Oak Brook; Bradley A. Mitchell, Antioch, both of Ill.

[73] Assignee: ECS Corporation, Oak Park, Ill.

[21] Appl. No.: 714,638

[22] Filed: Jun. 13, 1991

[51] Int. Cl.[5] .............. B65G 15/00

[52] U.S. Cl. .............. 198/323; 198/331; 198/502.4

[58] Field of Search .............. 198/323, 328, 502.4, 198/322, 331

[56] References Cited

U.S. PATENT DOCUMENTS

| | | | |
|---|---|---|---|
| 3,580,376 | 5/1971 | Loshbough | 198/323 |
| 3,809,206 | 5/1974 | Bredehorn et al. | 198/323 |
| 3,835,977 | 9/1974 | Hewitt et al. | 198/338 X |
| 4,264,905 | 4/1981 | Shapiro | 198/502.4 X |
| 4,340,131 | 7/1982 | Eriksson | 198/323 X |
| 4,564,099 | 1/1986 | Uozumi | 198/323 |
| 4,588,065 | 5/1986 | Maiden et al. | 198/323 |
| 4,664,247 | 5/1987 | Wolf et al. | 198/323 |
| 4,924,995 | 5/1990 | Adrian et al. | 198/323 |
| 4,926,981 | 5/1990 | Bruehl et al. | 198/323 X |
| 4,927,136 | 5/1990 | Leask | 198/323 X |

*Primary Examiner*—Robert P. Olszewski
*Assistant Examiner*—Cheryl L. Gastineau
*Attorney, Agent, or Firm*—Emrich & Dithmar

[57] ABSTRACT

A handrail monitoring system for use in a passenger conveyor such as an escalator, moving sidewalk or the like, compares the speed of each handrail against their nominal installed speed and responds when the handrail speeds differ from nominal by a selected percentage, i.e., when the difference in speed is 5, 10, 15 or 20%, as selected by an operator. Handrail speed is compared with the nominal handrail speed which may be established over a continuous range of speeds depending upon the installation. The system outputs either an immediate audio and/or visual alarm upon excessive slowing of a handrail or a delayed audio and/or visual alarm following a selected time interval to allow for temporary, short interruptions in handrail transport not due to conveyor system malfunction, but rather frequently due to passenger interference with the handrail. Provision is also made for automatically stopping the escalator upon detection of a handrail fault as well as recording the number of such faults in monitoring handrail operation.

20 Claims, 4 Drawing Sheets

HANDRAIL MONITORING SYSTEM

FIELD OF THE INVENTION

This invention relates generally to conveyor-type people movers having a handrail and is particularly directed to a handrail monitor system such as for use in an escalator, moving sidewalk or the like.

BACKGROUND OF THE INVENTION

An escalator, and other similar types of passenger conveyors such as moving walks, generally include a passenger supporting moving walkway and a pair of handrails which move generally in synchronism with the walkway. The individual steps of the escalator are conveyed typically by means of an endless chain at a generally constant speed. While the handrails are intended to move at the same speed as the passenger support and transport mechanism, this is not always the case. For example, installation variations and mechanical tolerances of the various components may cause the handrails to operate at a slower speed than the support/transport mechanism. In addition, changes in the environment as well as the extent of usage frequently result in handrail speed variation. For example, the cotton fibers used in most handrails are responsive to changes in temperature and humidity giving rise to changes in handrail tension. Changes in handrail tension, in turn, cause handrail slippage and speed reduction. Handrail slippage also causes excessive handrail wear because most handrails are frictionally driven requiring frequent replacement. In addition, handrails tend to stretch with use and particularly with abuse. Such abuse may take the form of either pulling on the handrail or engaging the handrail with an object for the purpose of either temporarily or permanently interrupting handrail operation.

Changes in handrail speed with respect to the speed of the transport/support mechanism can be dangerous, particularly in the case of escalators. When moving upward, slower displacement of the handrails causes one to lean rearward, sometimes resulting in a loss of balance and a dangerous fall down the escalator. Slower movement of the handrails as the escalator moves downward also frequently causes one being transported to lose his or her balance and fall on the sharp edged stairs. Even in a generally horizontal moving walk, a speed differential between the support/transport mechanism and the slower handrail frequently causes one to lean rearward resulting in a loss of balance and a potentially dangerous fall, particularly in the case of the elderly and infirm.

Prior attempts to eliminate the hazard of slow moving handrails have addressed only a complete failure of the handrail transport system resulting in its stopping. In response to handrail stoppage, prior approaches have provided for the automatic shutdown of the escalator to prevent serious injury. In fact, continuous slippage of the handrails is frequently more dangerous than complete stoppage because a slipping handrail tends to lull the passenger into a false sense of security as he or she rests upon the handrail, resulting in an ever increasing displacement between the passenger's feet and hands. Suddenly, the passenger is in an awkward position, loses his or her balance, and falls down to the walkway. Moreover, slippage causes deterioration of the handrail to the point that the handrail is usually seriously damaged when its motion is completely interrupted.

OBJECTS AND SUMMARY OF THE INVENTION

Accordingly, it is an object of the present invention to improve safety, reliability and operation in conveyor-type people movers, such as escalators, having moving handrails for user support.

Another object of the present invention is to monitor the speed of the handrails of an escalator and to provide an alert, and to perhaps even stop the escalator, when handrail speed is less than a selected or selectable percent of escalator speed.

Yet another object of the present invention is to provide a handrail monitoring capability for a passenger conveyor system which is inexpensive, easily retrofit into existing conveyor systems, and closely monitors handrail belt wear by detecting even slight belt slippage.

A further object of the present invention is to provide separate and independent monitoring of each handrail in an escalator and to automatically shut the escalator down when either or both handrails drop below a selected speed relative to escalator speed.

A still further object of the present invention is t monitor the handrail of an escalator and to immediately shut the escalator down, or to shut the escalator down after a selected time delay, when handrail speed drops below a selectable percentage of escalator speed.

This invention contemplates a handrail monitor system for use in a passenger conveyor having a moving walk and at least one moving handrail for grasping by and providing support for a passenger, the handrail monitor system comprising: a reference signal source for generating a first reference signal representing a selectable percent of escalator speed; a sensor coupled to the handrail for measuring handrail speed and generating a second signal representing the speed of the handrail, wherein the speed of the handrail is greater than zero; a comparator coupled to the reference signal source and to the sensor for comparing the first reference signal and the second signal and for providing a fault signal when the second signal is less than the first reference signal; and an indicator or alarm coupled to the comparator and responsive to the fault signal for providing an indication that handrail speed is less than the predetermined percent of escalator speed.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
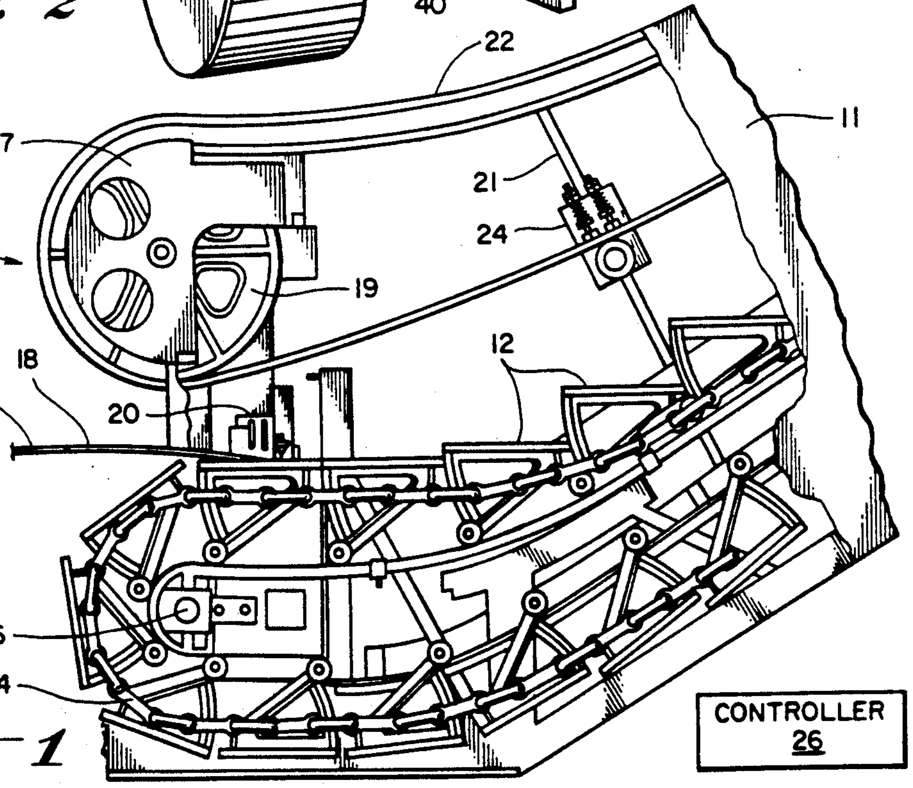
FIG. 1 is a simplified partially cutaway side view of a portion of an escalator for which the handrail monitor system of the present invention is intended for use.

Referring to FIG. 1, there is shown a partially cut-away side view of a lower portion of an escalator 10 with which the handrail monitoring system of the present invention is intended for use. The handrail monitoring system of the present invention may be used with virtually any conventional escalator installation and is particularly adapted for retrofit in existing escalators. As described above, the inventive handrail monitoring system is equally adapted for use with any type of passenger conveyor arrangement including moving sidewalks.

The escalator 10 includes a pair of spaced balustrades 11, only one of which is shown in the figure for simplicity. Disposed between the balustrades 11 is a moving walkway comprised of a plurality of spaced steps 12. Each of the balustrades 11 encloses and provides support for a respective one of a pair of moving handrails 22. Each of the steps 12 is coupled to and linearly displaced by a step chain 14. The escalator 10 a)so includes a controller 26, which is shown in simplified block form in the figure, for displacing the step chain 14 and handrails 22 and for, in general, controlling the operation of the escalator. The escalator 10 typically includes a tension carriage 16 for maintaining the step chain 14 under a given tension. The escalator 10 may also include a broken chain safety device 20 for shutting the escalator 10 down should the step chain 14 break to prevent injury to escalator passengers. Additional components of the escalator 10 include comb and floor plates 18 at the upper and lower ends of the escalator which are closely spaced relative to the moving steps 12 and are intended to provide a substantially continuous support surface with the moving steps and to prevent objects from dropping below the floor 15 and into the escalator drive mechanism. Also shown is a newel stand 17 for providing support for either a drive or idler wheel 19 coupled to and supporting the handrail 22. A similar newel stand is located at the other end of the escalator, although it is not shown in the figure for simplicity.

Figure 2:
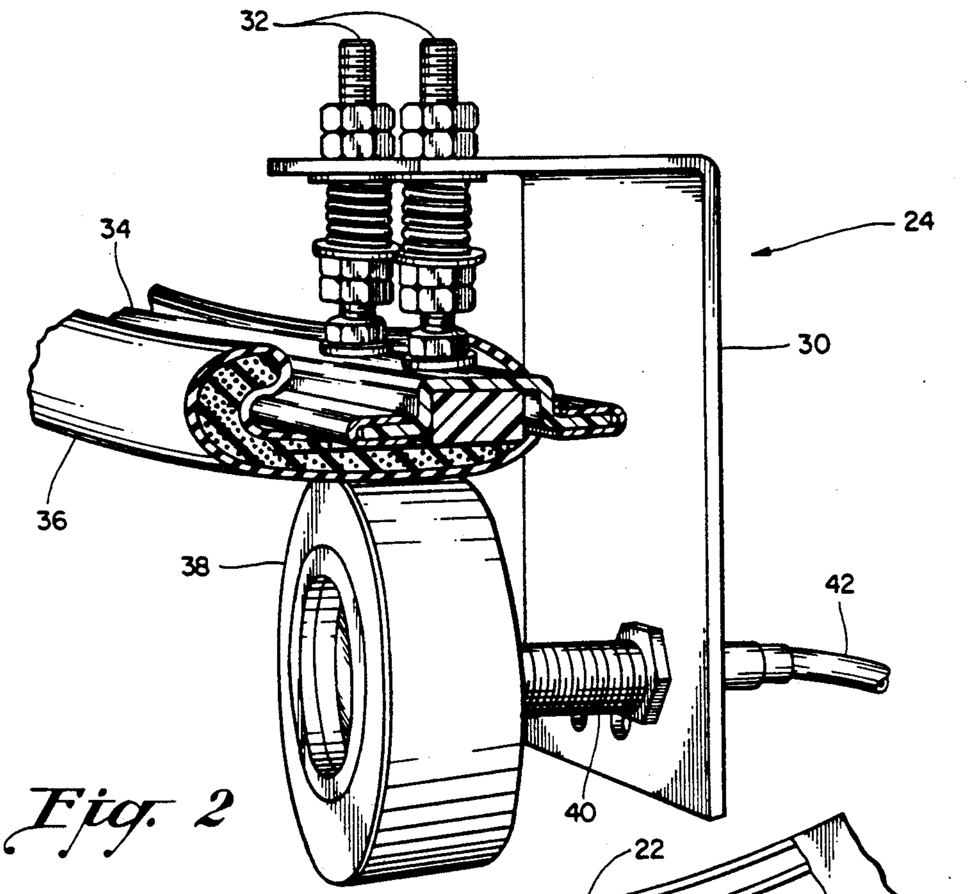
FIG. 2 is a perspective view of a handrail motion sensor for use in the handrail monitoring system of the present invention.

An escalator incorporating the present invention includes a handrail motion sensor 24 disposed within the balustrade 11 and coupled to a support post 21 therein. With reference to FIG. 2, there is shown a handrail motion sensor 24 for use in the handrail monitor system of the present invention. The present invention is not limited to use with the handrail motion sensor 24 shown in FIG. 2, but will operate equally well with virtually any motion sensor capable of detecting displacement of the escalator handrail 36. The handrail motion sensor 24 includes a generally L-shaped angle bracket 30 for securely mounting the motion sensor within the escalator's balustrade. The portion of the handrail 36 shown in FIG. 2 corresponds to the return run portion of the handrail within the escalator's balustrade. In the return run portion of the escalator handrail 36, a guide rail 34 is positioned in a fixed manner within the balustrade and engages and provides support for the handrail 36. The guide rail 34 is typically comprised of a high strength metal or plastic/non-metallic material and includes lateral extensions inserted within respective curved side portions of the handrail 36 for supporting the handrail along a substantial portion of its return run within the balustrade. The motion sensor 24 further includes a pick-off wheel 38 coupled to the angle bracket 30 by means of a proximity head 40. The pick-off wheel 38 engages and is rotationally displaced by the moving handrail 36. Linear displacement of the handrail 36 is converted to rotational displacement of the pick-off wheel 38 which, in turn, causes the proximity head 40 to generate a pulsed signal representing the displacement and speed of the moving handrail. As the speed of the handrail 36 increases, the number of pulses output by the motion sensor 24 similarly increases. These output pulses are provided via an appropriate electrical lead 42 to signal detection and processing circuitry described below. In a typical installation, the pick-off wheel 38 is provided with a metal insert (not shown) in a lateral portion of the wheel facing the angle bracket 30. An inductive proximity head 40 is disposed adjacent to the lateral portion of the pick-off wheel 38 and is coupled to the electrical lead 42. With the pick-off wheel 38 preferably comprised of a non-magnetic material such as rubber, the inductive proximity sensor detects rotational displacement of the wheel by sensing each revolution the position of the metal insert in the wheel. Thus, a series of pulses indicating pick-off wheel 38 rotation is provided from the inductive proximity head 40 to the electrical lead 42, with the pulse rate of the signal determined by the speed of rotation of the wheel. A pair of tensioners 32, each comprised of a combination of a threaded bolt, nuts and a coiled spring, is coupled to an upper portion of the angle bracket 30 and engages the return run of the guide rail 34. The tensioners 32 urge the bracket 24 upward and thus force the pick-off wheel 38 against the handrail 36 and maintain it under tension.

Figure 3A:
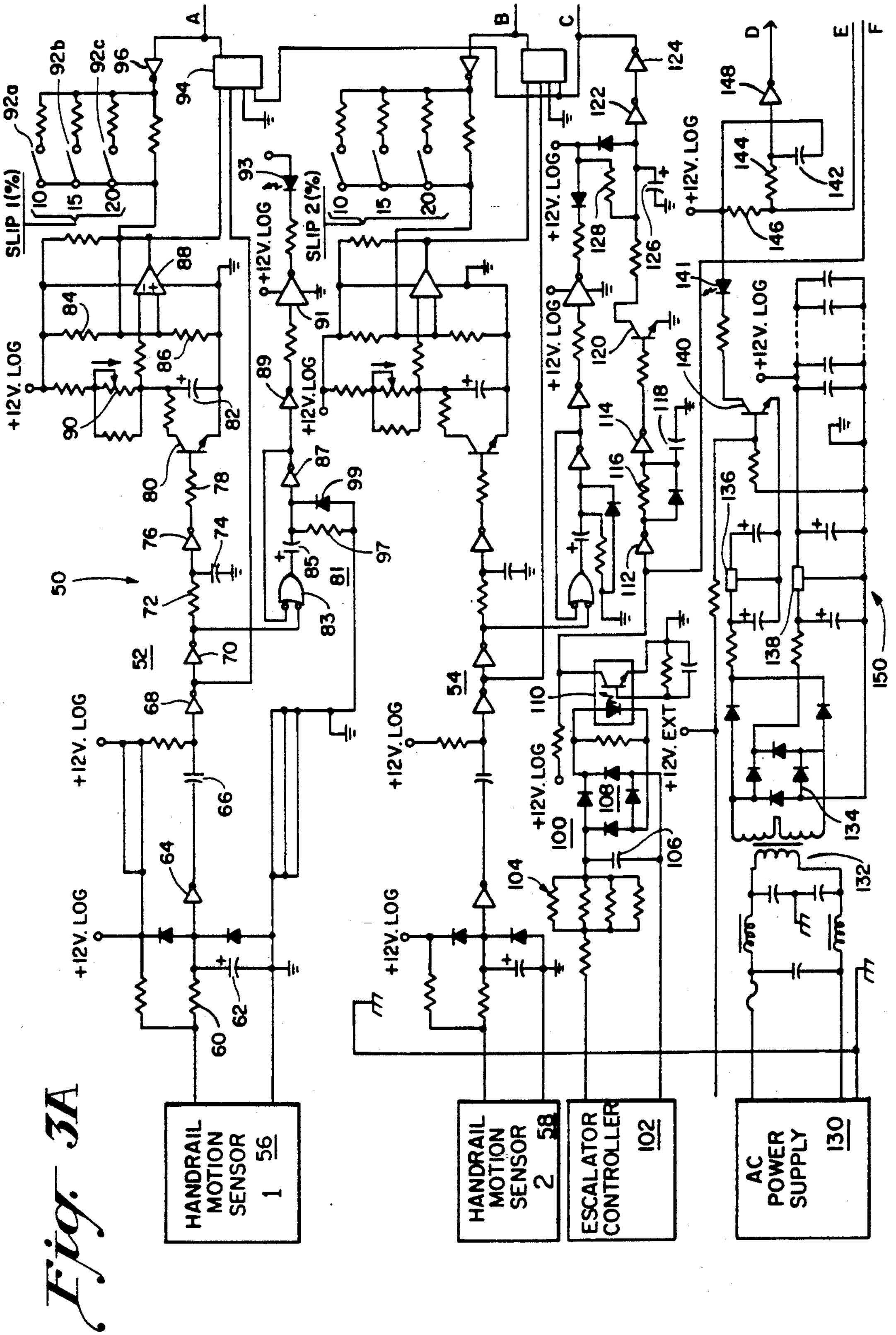
FIGS. 3A and 3B are a combined schematic and block diagram of control circuitry for use in the handrail monitoring system of the present invention.
Figure 3B:
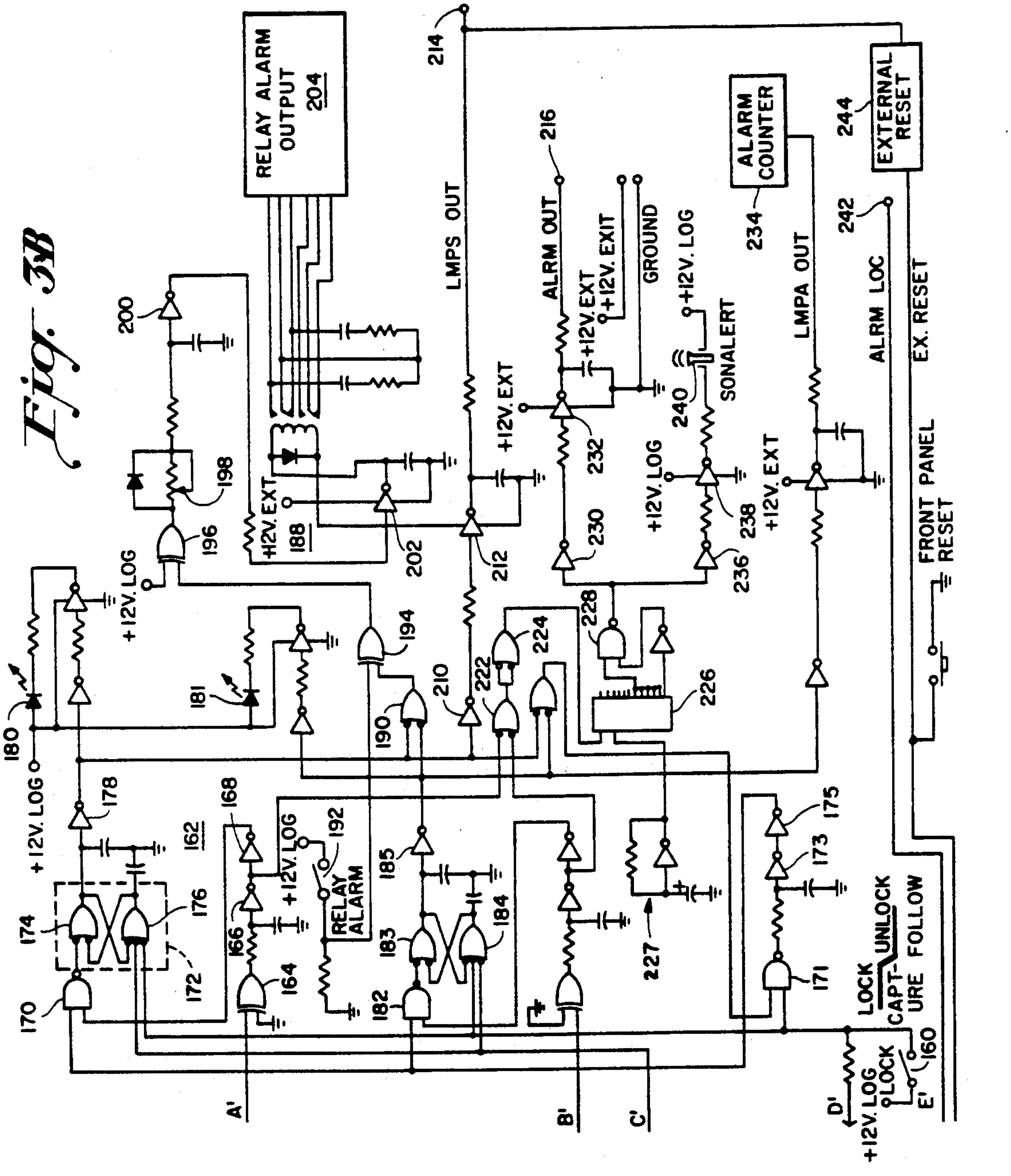

Referring to FIGS. 3A and 3B, there is shown in simplified block and schematic diagram form a handrail monitor system 50 in accordance with the present invention. The connections between FIGS. 3A and 3B are represented by letters A—A', B-B', etc. The handrail monitor system 50 includes first and second handrail monitor circuits 52 and 54, each including respective first and second handrail motion sensors 56 and 58 as previously described and as shown in FIG. 2. The handrail monitor system 50 of the present invention provides independent and separate monitoring of the speed of each of the first and second escalator handrails. Because the first and second handrail monitor circuits 52, 54 are essentially identical, for simplicity only details of the first handrail monitor circuit 54 are described in the following paragraphs. The following detailed description of the handrail monitor system 50 does not discuss each and every component shown in FIGS. 3A and B, but only discusses those components and elements of the handrail monitor system 50 necessary for a complete understanding of its configuration and operation.

As previously described, the handrail motion sensor 56 provides a pulsed input to the first handrail monitor circuit 52 representing the rotational speed of a pick-off wheel engaging the escalator handrail. This pulsed input is filtered by means of the combination of a resistor 60 and capacitor 62 to filter out high frequency interference. The signal is then provided via a plurality of inverters 64, 68 and 70 and a capacitor 66 to an RC filter comprised of resistor 72 and capacitor 74. These inverters as well as the other inverters in the handrail monitor system 50 operate as Schmitt triggers. Capacitor 66 provides AC coupling for the handrail motion signal output by the first handrail motion sensor 56. The signal is then provided via an inverter 76 and resistor 78 to the base of an NPN transistor 80.

The collector of NPN transistor 80 is coupled to a capacitor 82. When capacitor 82 charges up, it provides an input to the negative input pin of a comparator 88. Capacitor 82 discharges by means of the pulsed turn-on of transistor 80 in response to a series of pulses representing handrail speed output by the handrail motion sensor 56. High frequency pulses provided to transistor 80 allows for more frequent discharge of capacitor 82, preventing it from fully charging and providing an input to comparator 88. A variable potentiometer 90 is also coupled to capacitor 82 for controlling the rate at which the capacitor charges. The manually adjustable potentiometer 90 adjusts the charge rate of capacitor 82. Thus, by increasing the charge rate of capacitor 82 by proper setting of potentiometer 90, high speed escalator operation may be accommodated for in the handrail monitor system 50. Similarly, reducing the charge rate of capacitor 82 by adjusting the resistance of potentiometer 90 allows for comparison of handrail speed with slower escalator speeds.

A reference voltage is provided to the other input of comparator 88 by means of a voltage divider network comprised of resistors 84 and 86. Coupled to the voltage divider network comprised of resistors 84, 86 is a feedback circuit which includes an inverter 96 and a DIP switch array comprised of first, second and third DIP switches 92*a*, 92*b* and 92*c*. Each of the three DIP switches 92*a*, 92*b* and 92*c* possesses an internal resistance and by selectively switching in either the first, second or third DIP switches in circuit, the current in the feedback circuit may be changed in order to control the hysteresis of the comparator with respect to the positive and negative inputs to the comparator. By selecting one of the three DIP switches 92*a*, 92*b* or 92*c*, the turn-on point of comparator 88 with a difference in its positive and negative inputs may be selected, as desired. For example, a maximum hysteresis representing maximum difference between the two inputs to comparator 88 for turn-on of the comparator would be provided with none of the three DIP switches closed. Closure of the first DIP switch 92*a* causes comparator 88 to trip when handrail speed goes 5% below escalator speed. Closure of the second DIP switch 92*b* causes a tripping of comparator 88 when handrail speed is more than 10% less than escalator speed. Closure of the third DIP switch 92*c* causes a tripping of comparator 88 when handrail speed is more than 20% less than escalator speed. These percentage reductions can assume virtually any value depending on the values of the internal resistances of the first, second and third DIP switches 92*a*, 92*b* and 92*c*, with reductions of five, ten, fifteen and twenty percent used in a preferred embodiment of the present invention. Comparator 88 thus changes state when handrail speed is less than a selected reference input to the comparator. Thus, comparator 88 may be caused to change state when the difference between handrail and escalator speed is five percent, ten percent, fifteen percent or twenty percent depending upon which of the three DIP switches 92*a*, 92*b* and 92*c* is closed.

In addition to a fault signal output from comparator 88 to IC 94, the handrail monitor circuit 52 also provides a visual indication that the handrail monitoring system 50 is operating. This signal is derived from the output of inverter 70 and is provided to one input of a NOR gate 83 in a monostable multivibrator 81. The monostable multivibrator 81 further includes a capacitor 85, a resistor 97, a diode 99 and an inverter 87 with feedback. In response to the receipt of a series of pulses from the first handrail monitor circuit 52 representing displacement of the handrail and operation of the handrail monitor system 50, monostable multivibrator 81 outputs a signal via inverters 89 and 91 for turning on an LED 93. Illumination of LED 93 provides a visual indication that an input representing handrail operation is received by the handrail monitor system 50. Monostable multivibrator 81 extends the pulses output from the first handrail monitor circuit 52 to cause continuous turn-on of input LED 93 representing a valid input from the first handrail monitor sensor 56.

A fault signal output from comparator 88 is provided to the SET input of IC 94 which functions as a flip-flop. To the RESET input of IC 94 is provided an ENABLE signal from an enable circuit 100. The enable circuit 100 is coupled to an escalator controller 102 and is responsive to an output therefrom representing operation of the escalator system including the handrails. The output signal from the escalator controller 102 is provided via a filter network comprised of parallel coupled resistors 104 and capacitor 106 to a rectifying bridge 108. The DC output from bridge 108 is provided to an optoisolator 110 and thence to a pair of serially coupled inverters 112 and 114. Opto-isolator 110 isolates the handrail monitor system 50 from the escalator controller 102 and protects the components of the monitor system from surge variations in the ENABLE signal input. A filter network comprised of resistor 116 and capacitor 118 is disposed between inverters 112 and 114 10 for filtering out noise spikes in the ENABLE signal. The filtered ENABLE signal is provided to the base of an NPN transistor 120. Turn-on of transistor 120 causes charging of grounded capacitor 126 via resistor 128. The time constant of the RC network comprised of capacitor 126 and resistor 128 introduces a delay in the ENABLE signal provided via serially coupled inverters 122 and 124 to the RESET input of IC 94. This time delay, which in a preferred embodiment is ten seconds, enables IC 94 to transmit a fault signal received from comparator 88 only after this predetermined time interval. This permits the escalator to achieve essentially full speed before the handrail monitor system 50 begins comparing handrail speed. The ENABLE signal provided to IC 94 thus introduces a predetermined time delay in handrail monitor system operation to ensure that the escalator has reached its operating speed prior to monitoring of handrail speed. In the absence of a ENABLE signal from the escalator controller 102 to the enable circuit 100, the handrail monitor system 50 monitors handrail speed, but does not output any signals representing handrail status.

The handrail monitor system 50 is coupled to and energized by an AC power supply 130. An AC input is provided via a step-down transformer 132 to a rectifying bridge 134 which, in turn, provides a DC output to first and second voltage regulators 136 and 138. The first and second voltage regulators 136, 138 output a regulated 12 VDC. The second voltage regulator 138 is coupled to a bank of filter capacitors 150 which provides filtering between the AC power supply 130 and the various IC's in the handrail monitor system 50. The first voltage regulator 136 provides a regulated 12 VDC for operation of the handrail monitor system 50. The output of the first voltage regulator 136 is provided to the base of an NPN transistor 140 Which, in turn, is coupled to and energizes a power-on LED 141. Turn-on of LED 141 provides a visual indication that the handrail monitor system 50 is receiving power and is turned on. The output of transistor 140 is provided via an RC network comprised of resistors 144 and 146 and capacitor 142 to an inverter 148. This RC network is coupled to an EXTERNAL RESET selector 244 which allows for manual resetting of the handrail monitor system 50. Resistors 144 and 146 and capacitor 142 providing filtering for the reset signal received from the EXTERNAL RESET selector 244.

Following system power up and receipt of an ENABLE signal from the escalator controller 102 via the enable circuit 100, IC 94 provides a fault signal to various alarm and detector circuits as well as to a capture/follow circuit 162. In the capture/follow circuit 162, the output of IC 94 is provided first to an EXCLUSIVE-OR gate 164 and thence via a pair of serially coupled inverters 166 and 168 to a NAND gate 170. The other input to NAND gate 170 is provided from a CAPTURE/FOLLOW switch 160 via NAND gate 171 and inverters 173 and 175. The position of the CAPTURE/FOLLOW switch 160 determines the mode of operation of the CAPTURE/FOLLOW circuit 162. The output of NAND gate 170 is provided to a flip-flop circuit 172 comprised of NOR gates 174 and 176. The other inputs to the flip-flop circuit 172 are received from the CAPTURE/FOLLOW switch 160 and the ENABLE circuit 100. With a fault signal received by flip-flop 172 from IC 94, the flip-flop provides an output signal via inverter 178 to a fault indicator LED 180 for illuminating the LED and providing a visual indication of a handrail fault. The output of flip-flop 172 is also provided via inverter 178 to a relay alarm circuit 188. The relay alarm circuit 188 includes a NOR gate 190, EXCLUSIVE-OR gates 194, 196, a potentiometer 198, serially coupled inverters 200 and 202, and a relay alarm output 204. Other inputs from the CAPTURE/FOLLOW switch 160, the input power circuit, and the ENABLE circuit 100 are logically combined by means of a NAND gate 182, NOR gates 183 and 184 and an inverter 185 for providing the other input to NOR gate 190.

The input from the CAPTURE/FOLLOW switch 160 to flip-flop 172 controls whether the flip-flop operates in a capture, or latch, mode or a follow mode. With the CAPTURE/FOLLOW switch 160 closed, a change in the output of comparator 88 representing a handrail fault, which is provided via IC 94 to flip-flop 172, causes the flip-flop to operate in a capture mode such that the fault is locked in and the escalator system is shut-down, as described below. With the CAPTURE/FOLLOW switch 160 open, flip-flop 172 operates in a follow or latched mode upon receipt of a handrail fault signal from comparator 88 via IC 94. In this mode, flip-flop 172 outputs a signal representing a handrail fault, but ceases to output such a signal following termination of the fault. Thus, once the handrail fault is no longer present, flip-flop 172 no longer outputs a fault signal and the escalator and handrail monitor system can resume normal operation.

The manner in which a fault signal is provided to the relay alarm output 204 is also controlled by the status of the CAPTURE/FOLLOW switch 160 as well as the position of the RELAY ALARM switch 192. The RELAY ALARM switch 192, which provides an input to the relay alarm circuit 188 at EXCLUSIVE-OR gate 194, establishes the power-on state of the relay alarm output 204. With the relay alarm output switch 192 open, the relay alarm output 204 is energized. Conversely, with the relay alarm output switch 192 closed, the relay alarm output 204 is de-energized. With the relay alarm output 204 energized, a loss of power will cause a change in state of the relay alarm output indicating a handrail fault. With the relay alarm output 204 de-energized, the relay alarm output will not change state following a handrail fault. In the latter case, a handrail fault could occur without any indication of the fault being provided. An adjustable alarm delay potentiometer 198 establishes the time delay from receipt of a handrail fault signal to escalator system shut-down when the relay alarm output 204 is energized. The delayed signal at the relay alarm output 204 allows a short fault signal to be detected and processed without shutting down the escalator if the fault goes away within the predetermined time period as established by an adjustable alarm delay potentiometer 198. Thus, with the time delay set by alarm delay potentiometer 198 at ten seconds, removal of the fault within ten seconds of occurrence will maintain the relay alarm output 204 energized for continued operation of the escalator system. The relay alarm output 204 may be coupled to the escalator controller 102, although this is not shown in the figures for simplicity, to automatically shut the escalator down following the occurrence of a handrail fault signal from either the first or second handrail monitor circuit 52, 54.

Flip-flop circuit 172 provides an immediate, or undelayed, fault indication signal via inverters 210 and 212 to a first lamp output 214. Illumination of the first lamp 214 thus provides an immediate visual indication of a problem with movement of the first handrail. The first lamp output 214 may be coupled to the External Reset 244 for automatically resetting the handrail monitor system 50 following a handrail fault.

The output of flip-flop circuit 172 is also provided via NOR gates 222 and 224 to an IC 226. IC 226 is coupled to an alarm output 234 via a NAND gate 228 and inverters 230 and 232. Alarm output 234 allows an output for an external alarm such as a buzzer or solid state signal device. Also coupled to IC 226 via NAND gate 228 and inverters 236 and 238 is an audio alarm 240. Audio alarm 240 provides an immediate audio indication of a handrail fault. Audio alarm 240 is preferably a piezo electric device for providing an audio alert of a handrail fault. Handrail fault outputs from the first and second, or right and left, handrail monitor circuits 52 and 54 are NORed together at NOR gate 222 and provided to IC 226 which outputs a pulsed signal to operate the piezo electric audio alarm 240. Illumination of lamp output 214 indicates a handrail fault as detected by the first handrail monitor circuit 52. Illumination of the second lamp output 216 indicates detection of a handrail fault by the second handrail monitor circuit 54.

Figure 4:
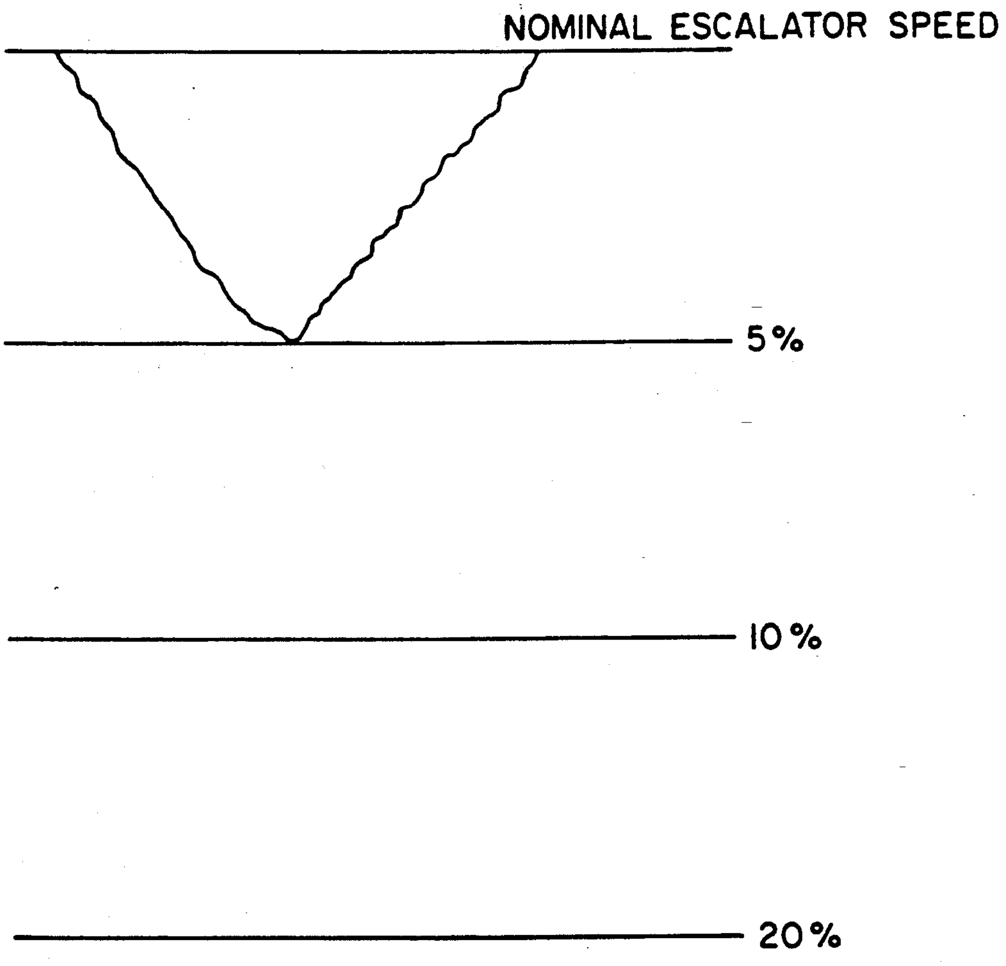
FIG. 4 is a simplified graphic diagram illustrating a procedure for setting up operation of the handrail monitoring system of the present invention.

The handrail monitor system 50 is initially set-up for operation by an operator in the following manner. First, one of the first, second or third DIP switches **92*a*, 92*b* or 92*c* is closed. In the present description, we will consider only the closure of the first DIP switch 92*a* representing a handrail speed of at least five percent less than the handrail speed for triggering a handrail fault. This provides the reference voltage input via the voltage divider comprised of resistors 84 and 86 to the positive terminal of comparator 88. Next, potentiometer 90 is adjusted such that the discharge of capacitor 82 to the negative input of comparator 88** corresponds to handrail speed. Potentiometer 90 is then further adjusted as shown in FIG. 4 by changing the input of discharging capacitor 82 to comparator 88 until this input equals the five percent differential voltage from the reference voltage input to the comparator. When the manually adjusted handrail speed is five percent less than the reference voltage input to comparator 88, fault indicator LED 180 illuminates and the voltage representing handrail speed is manually backed off by means of potentiometer 90 to the nominal handrail speed as shown in the figure. Comparator 88 then compares handrail speed with a five percent reduction in the reference voltage representing escalator speed. A similar procedure would be followed for setting the handrail speed alarm at either ten percent or twenty percent less than the reference escalator speed.

There has thus been shown a handrail monitoring system for an escalator or similar conveyor-type people mover for independently comparing the speed of each handrail with that of the escalator and providing an alarm as well as shutdown of the escalator when the handrail speed differs from escalator speed by a predetermined percentage. Handrail speed as compared with a reference escalator speed which may be set over a continuous range of speeds depending upon the escalator installation. The handrail alarm may be either visual and/or aural and may be either immediate upon slowing down of the handrail or delayed to allow for intermittent interruptions in the handrail speed without shutting down the escalator. A lock-out provision may be selected for preventing escalator start-up until the handrail fault is cleared.

While particular embodiments of the present invention have been shown and described, it will be obvious to those skilled in the art that changes and modifications may be made without departing from the invention in its broader aspects. Therefore, the aim in the appended claims is to cover all such changes and modifications a fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use in a passenger conveyor having a moving escalator and at least one moving handrail for grasping by and providing support for a passenger, a handrail monitor system comprising:

reference means for generating a first reference signal representing a predetermined percent of escalator speed;

first sensing means coupled to said at least one handrail for measuring handrail speed and generating a second signal representing the speed of said at least one handrail, wherein the speed of said at least one handrail is greater than zero;

comparison means coupled to said reference means and to said first sensing means for comparing said first reference signal and said second signal and for providing a fault signal when said second signal is less than said first reference signal; and indicator means coupled to said comparison means and responsive to said fault signal for providing an indication that handrail speed is less than said predetermined percent of escalator speed.

2. The system of claim 1, wherein said reference means includes first control means for selecting said predetermined percent of escalator speed from a range of values.

3. The system of claim 2, wherein said first control means includes a plurality of selectable switches each representing a given percent of escalator speed.

4. The system of claim 2, wherein said predetermined percent of escalator speed can be selected from the range of 5-20% of escalator speed.

5. The system of claim 1 wherein said first sensing means includes second control means for normalizing said first reference signal and said second signal in compensating for escalator speed.

6. The system of claim 5, wherein said comparison means includes a comparator to which said first reference signal and said second signal are provided, and wherein said second control means includes a potentiometer for adjusting a voltage of said second signal in normalizing said first reference signal and said second signal.

7. The system of claim 1 further comprising enabling means coupled to the escalator and responsive to operation thereof for enabling the handrail monitor system during escalator operation.

8. The system of claim 7, wherein said enabling means includes a delay circuit for delaying enabling of the handrail monitor system a predetermined time period following escalator start-up.

9. The system of claim 1 further comprising output signal means coupled to the escalator and to said comparison means and responsive to said fault signal for automatically terminating the operation of the escalator and handrail when the handrail speed is less than said predetermined percent of escalator speed.

10. The system of claim 9, wherein said output signal means includes a delay circuit for delaying shut-down of the installator and handrail for a predetermined time period following detection of said fault signal.

11. The system of claim 10, wherein said delay circuit includes variable delay means for delaying shut-down of the escalator and handrail over a selected time interval.

12. The system of claim 11, wherein said selected time interval is from 2-20 seconds following detection of said fault signal.

13. The system of claim 9 further comprising latch means coupled to said output signal means for maintaining the escalator and handrail in a shut-down condition until manually restarted.

14. The system of claim 13 further comprising temporary shut-down means coupled to said output signal means for maintaining the escalator and handrail in a shut-down condition only for the duration of said fault signal, and wherein the handrail monitor system further includes manual switching means for providing said fault signal to either said latch means or to said temporary shut-down means, as desired.

15. The system of claim 1, wherein said indicator means includes a visual alarm indicating that handrail speed is less than said predetermined percent of escalator speed.

16. The system of claim 1, wherein said indicator means includes an audio alarm indicating that handrail speed is less than said predetermined percent of escalator speed.

17. The system of claim 1, wherein the passenger conveyor includes first and second spaced moving handrails and said handrail monitor system further includes second sensing means, and wherein said first and second sensing means are respectively coupled to said first and second handrails for providing a fault signal when the speed of either of the handrails is less than said predetermined percent of escalator speed.

18. For use in a passenger conveyor including a moving escalator and first and second moving handrails for grasping by and providing support for a passenger, a handrail monitor system comprising:

reference means for providing a reference signal representing a predetermined percent of escalator speed;

first sensing means coupled to said first handrail and responsive to its displacement for providing a first handrail signal representing the speed of the first handrail;

second sensing means coupled to said second handrail and responsive to its displacement for providing a second handrail signal representing the speed of the second handrail;

comparison means coupled to said reference means and to said first and second sensing means for comparing said first and second handrail signals to said reference signal and for providing a fault signal when either said first or second handrail signal is less than said reference signal indicating that the speed of either the first o second handrail is less than said predetermined percent of escalator speed; and alarm means coupled to said comparison means and responsive to said fault signal for providing an alarm when the speed of either the first or second handrail is less than said predetermined percent of escalator speed.

19. The handrail monitor system of claim 18 wherein the escalator includes a controller coupled to said comparison means and responsive to said fault signal for shutting down the escalator when the speed of either the first or second handrail is less than said predetermined percent of escalator speed.

20. The handrail monitor system of claim 19 further comprising timer means coupled to said comparison means for delaying shutdown of the escalator a predetermined time period following the occurrence of a fault signal.

* * * * *

UNITED STATES PATENT AND TRADEMARK OFFICE
CERTIFICATE OF CORRECTION

PATENT NO. : 5,092,446

DATED : March 3, 1992

INVENTOR(S) : Sullivan, Jr. et al.

It is certified that error appears in the above-identified patent and that said Letters Patent is hereby corrected as shown below:

Col. 2 / Line 27: "t" should be --to--.

Col. 3 / Line 26: "a)so" should be --also--.

Col. 6 / Line 32: After "114", delete --10--.

Col. 6 / Line 50: "a" should be --an--.

Col. 9 / Line 38: "a" should be --as--.

Col. 12 / Line 4: "o" should be --or--.

Signed and Sealed this

Fourth Day of May, 1993

Attest:

MICHAEL K. KIRK

Attesting Officer

*Acting Commissioner of Patents and Trademarks*